United States Patent [19]

Jensen

[11] 4,127,106
[45] Nov. 28, 1978

[54] HOOD ASSEMBLY
[76] Inventor: Donald D. Jensen, 1141 Park Circle Dr., Fresno, Calif. 93727
[21] Appl. No.: 827,099
[22] Filed: Aug. 23, 1977

Related U.S. Application Data
[63] Continuation-in-part of Ser. No. 614,473, Sep. 18, 1975, Pat. No. 4,043,319.

[51] Int. Cl.[2] .......................... F24C 15/08; F23J 11/00

[52] U.S. Cl. .......................... 126/299 D; 55/DIG. 18; 55/DIG. 36; 98/115 SB; 118/326; 118/DIG. 7

[58] Field of Search ........ 98/115 R, 115 LH, 115 SB; 126/299 D, 299 E; 55/DIG. 18, DIG. 36; 118/DIG. 7, 326

[56] References Cited
U.S. PATENT DOCUMENTS

| | | | |
|---|---|---|---|
| 2,481,341 | 9/1949 | Pledger | 126/299 D |
| 3,400,649 | 9/1968 | Jensen | 126/299 D |
| 3,895,570 | 7/1975 | Eagleson, Jr. | 98/115 LH |
| 3,967,942 | 7/1976 | Pain et al. | 98/115 SB |

*Primary Examiner*—Ronald C. Capossela

*Attorney, Agent, or Firm*—William C. Babcock

[57] ABSTRACT

A hood assembly for at least partially defining an enclosure in which two or more non-parallel rapidly moving air streams cooperate to entrain minute air borne particles in the enclosure to recover the latter and prevent the escape of the particles through an opening in the forward part of the enclosure. The air defining the air streams may in whole or in part be discharged to the ambient atmosphere substantially free of entrained air borne particles, or the air may be sequentially recycled through the enclosure. The hood assembly is particularly adapted for paint spray booths, but is equally useful and effective, when the air borne particles constitute smoke or fumes.

7 Claims, 9 Drawing Figures

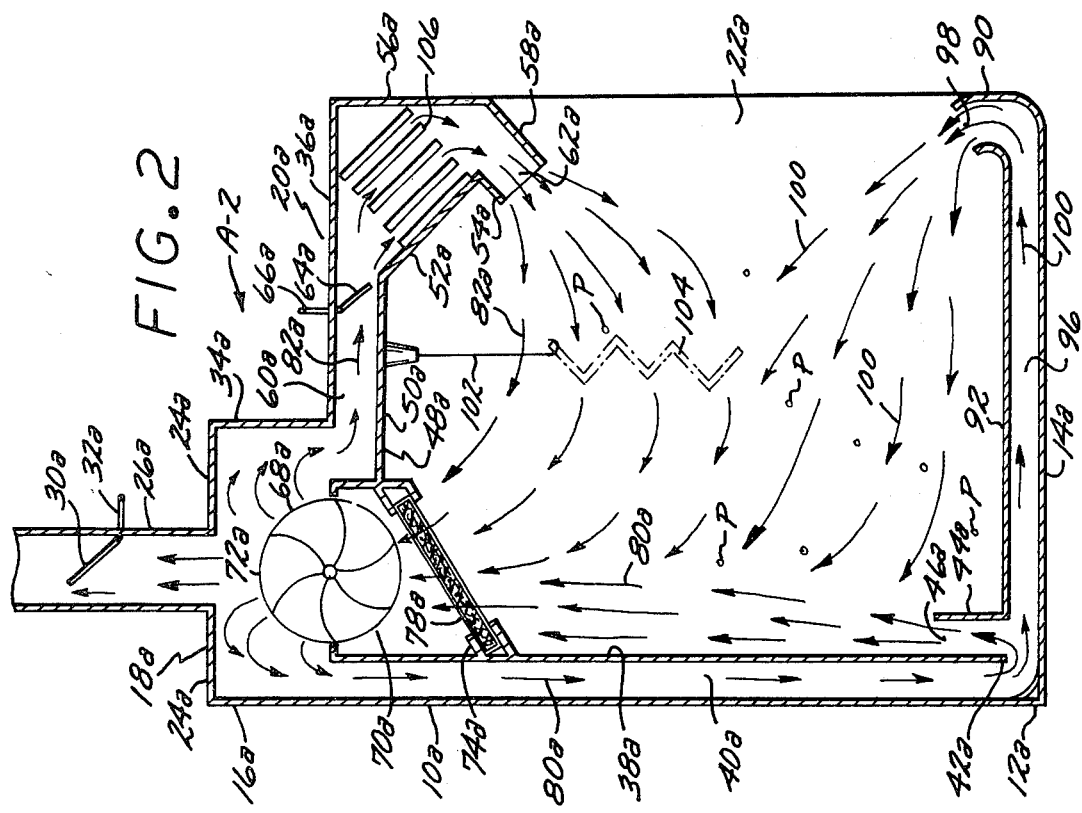
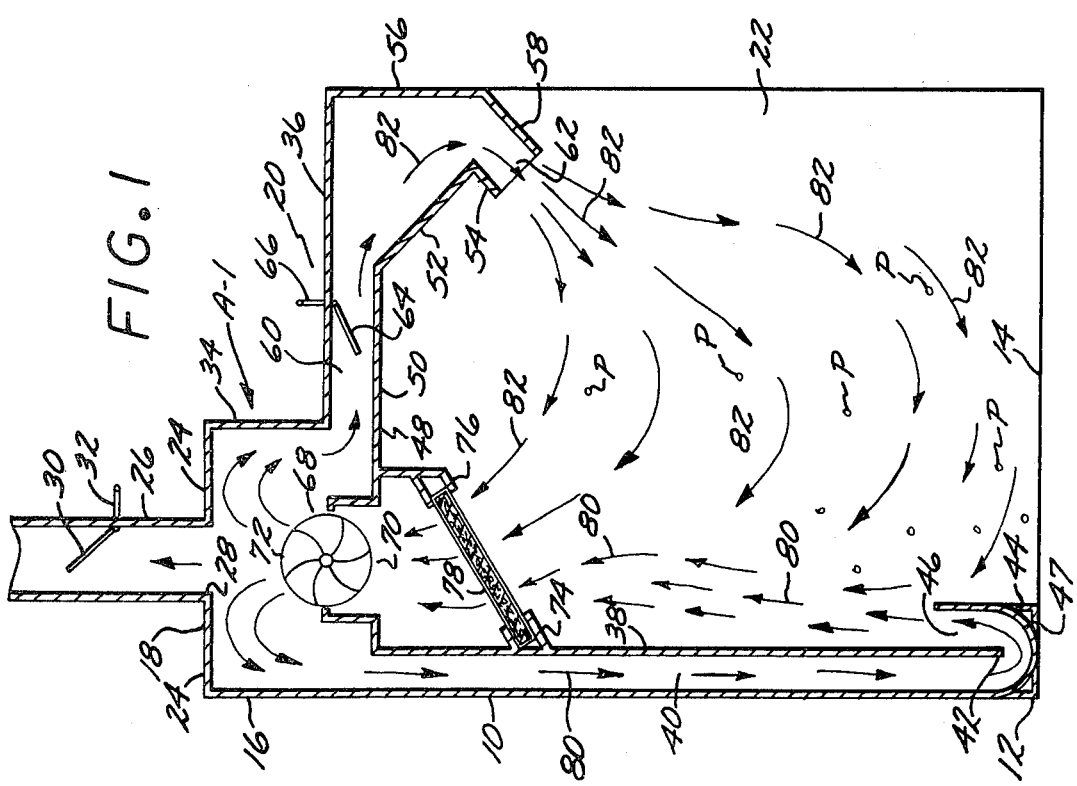

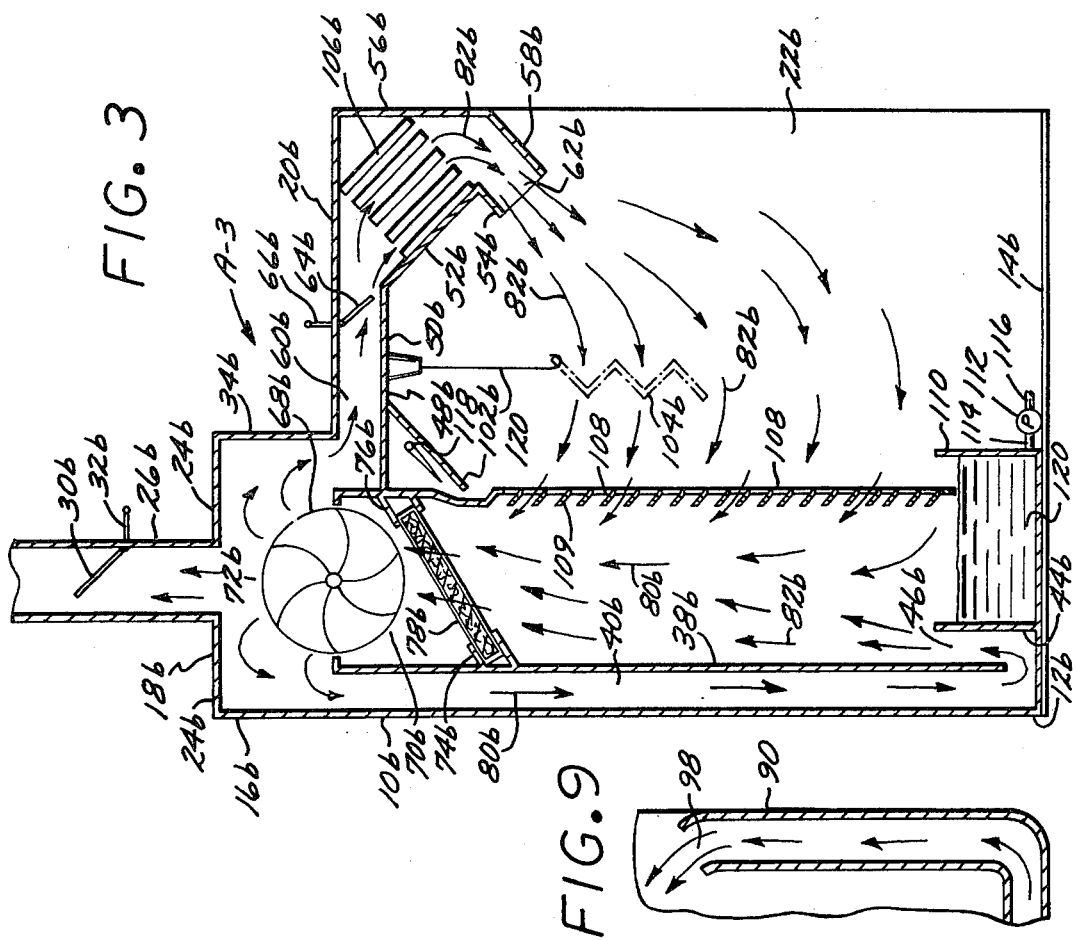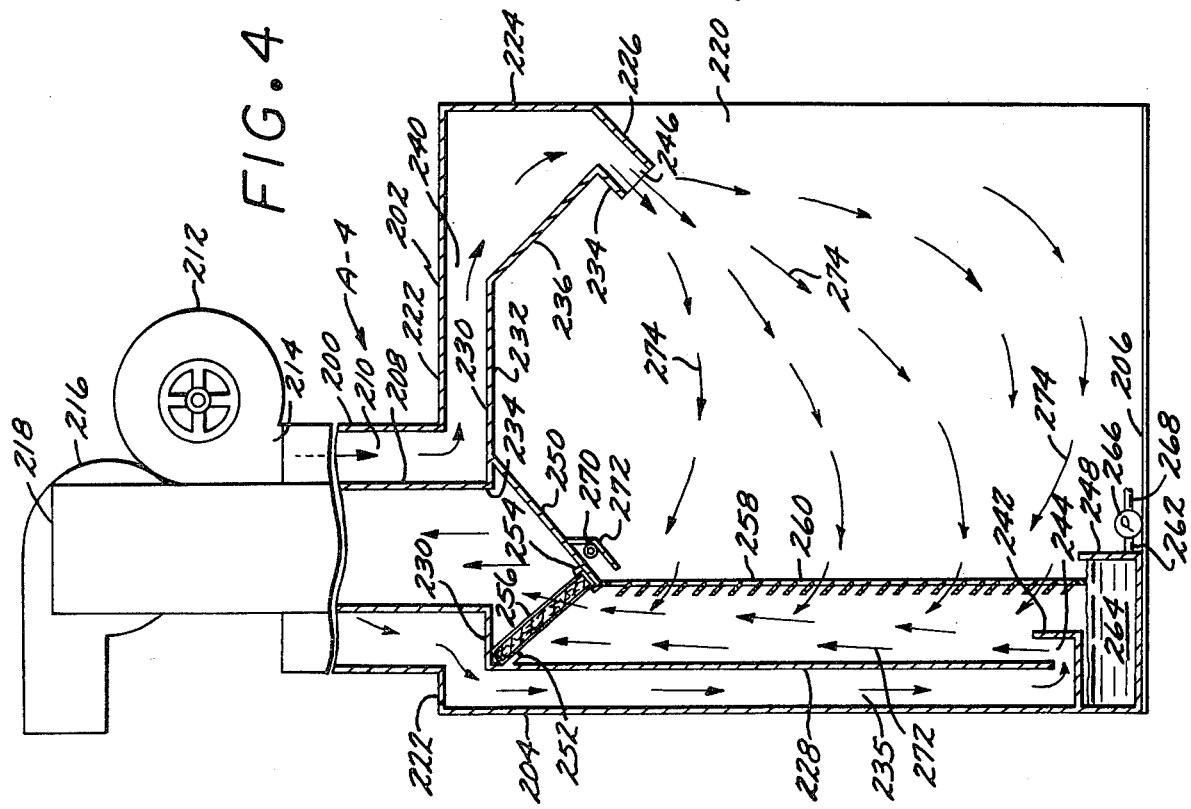

HOOD ASSEMBLY

CROSS-REFERENCE TO RELATED APPLICATION

The present application is a continuation-in-part of my application Ser. No. 614,473 entitled "Exhaust Hood" filed in the United States Patent Office on Sept. 18, 1975 and that will issue on Aug. 23, 1977 as U.S. Pat. No. 4,043,319.

BACKGROUND OF THE INVENTION

1. Field of the Invention
Improved Hood Assembly.
2. Description of the Prior Art In the past, it has been common practice to use hoods with power driven blowers to remove air borne particles from an enclosure. Such prior art devices, with the exception of the exhaust hood described and claimed in my co-pending application Ser. No. 614,473, have the operational disadvantage that while they removed air borne particles from the enclosure, they also removed substantial quantities of air from the room in which the enclosure is situated.

A major object of the present invention is to provide a hood assembly that substantially eliminates the operational disadvantages of the prior art devices with the use of but a single blower.

Another object of the present invention is to supply a hood assembly that is particularly adapted for use with a spray booth, but may be used equally effectively in commercial establishments such as restaurants to remove smoke, fumes and the like from an enclosure above a range, and with but a desired minimum of air being removed from the air of the room in which the hood assembly is situated.

BRIEF DESCRIPTION OF THE DRAWINGS

FIG. 1 is a transverse cross-sectional view of a first form of enclosure hood assembly;

FIG. 2 is a transverse cross-sectional view of a second form of enclosure hood assembly;

FIG. 3 is a transverse cross-sectional view of a third form of enclosure hood assembly;

FIG. 4 is a transverse cross-sectional view of a fourth form of enclosure hood assembly;

FIG. 9 is a fragmentary transverse cross-sectional view of a modified version of the second form of the invention.

DESCRIPTION OF THE PREFERRED EMBODIMENTS

Figure 5:
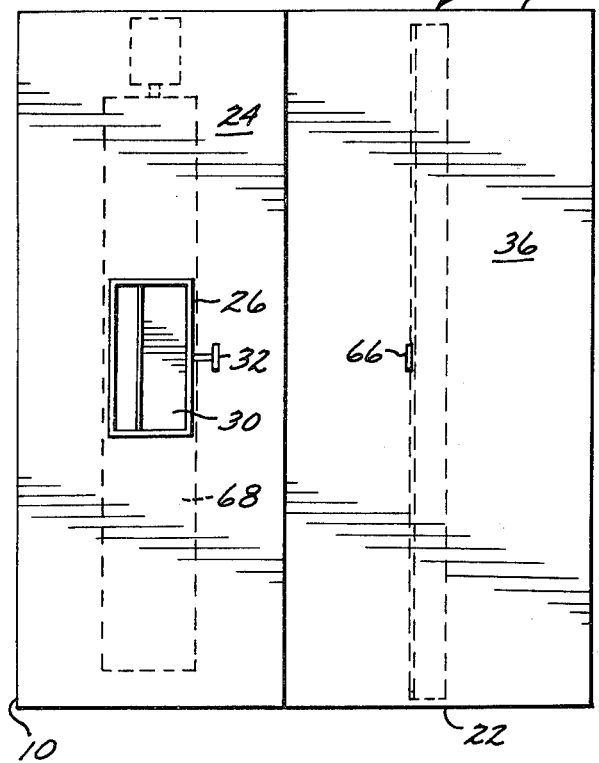
FIG. 5 is a top plan view of the first form of enclosure hood assembly shown in FIG. 1.

The first form A-1 of enclosure hood assembly as shown in FIGS. 1 and 5 includes a vertically extending back plate 10 that has a lower horizontal edge 12 situated adjacent a horizontal surface 14. The upper portion 16 of back plate 10 forms a portion of a housing 18 from which a hood 20 extends forwardly. The enclosure hood assembly A-1 includes a pair of spaced vertically extending end walls 22.

Housing 18 includes a first member 24 that extends horizontally between end walls 22. A stack 26 extends upwardly from an opening 28 in member 24. The stack 28 has a first pivotally supported damper 30 therein that may be adjusted by a handle 32. The first member 24 on its forward edge develops into a second member 34 that extends downwardly, and the second member on its lower edge merging into a third member 36 that extends forwardly.

A vertically extending back wall 38 is disposed forwardly of back plate 10 and cooperates therewith to define a first passage 40. Backwall 38 has a lower horizontal portion 42 situated a substantial distance above horizontal surface 14. A member 44 of transverse L-shape cross section as may be seen in FIG. 1 extends between end walls 22 and cooperates with the lower portion 42 to define an upwardly directed opening 46. A member 47 of transverse semi-circular cross section is situated within member 46 as shown in FIG. 1.

A forward wall 48 extends between end walls 22, with the forward wall including first, second and third portions 50, 52 and 54. The third member 36 has a first wall 56 depending downwardly from the forward edge thereof, and the first wall developing into a second wall 58 that extends downwardly and inwardly therefrom as shown in FIG. 1. The forward wall 48 is spaced inwardly from third member 36 and first and second walls 56 and 58 and cooperates with the latter to define a second passage 60 and second opening 62 that extends downwardly and inwardly.

The hood 20 has a second damper 64 pivotally supported therein that is controlled by a handle 66. The second damper 64 controls the flow of air through second passage 60. The upper portion of backwall 38 and rearward portion of forward wall 48 support a power driven fan type blower 68 therebetween, which blower has an air inlet 70 and air discharge 72.

First and second clips 74 and 76 are secured to the upper portion of backwall 38 and rearward part of forward wall 48 and serve to support a filter 78 therebetween.

When power driven blower 68 is actuated air is drawn upwardly to inlet 68 through filter 78 and is discharged to first and second passages 40 and 60, as well as to the stack 26. The flow of air through stack 26 and second passage 20 is controlled by the first and second dampers 60 and 64.

Air is discharged upwardly and forwardly from the first opening along the back wall 38 as a first stream 80 at a sufficient velocity as to create a negative pressure zone adjacent thereto to draw air borne particles P rearwardly and upwardly across the horizontal surface 14 to subsequently discharge onto the filter 78. A second stream of air 82 is discharged from the second opening 62 downwardly and rearwardly at an angle to direct any air borne particles P not already moving upwardly and rearwardly into the first air stream to mix therewith and subsequently be carried thereby onto the filter 78.

The blower 68 when operating maintains a negative air pressure above the filter 78 to encourage the flow of first and second air streams 80 and 82 therethrough, and the streams as they flow through the filter having substantially all of the air borne particles P removed therefrom. From the above description it will be apparent that only a desired amount of air need be discharged through the stack 26 to the ambient atmosphere, when air borne particles P are being removed from the interior of the first form of enclosure A-1. When the first damper 30 is closed, air will be recycled through the first form A-1 of the enclosure, and no air will be removed from the room in which the enclosure is situated. The first form A-1 of the enclosure is extremely versatile as to use and may serve as a paint spray booth, a hood assembly for laboratories, or above a hot cooking surface from which smoke and fumes arise.

Figure 6:
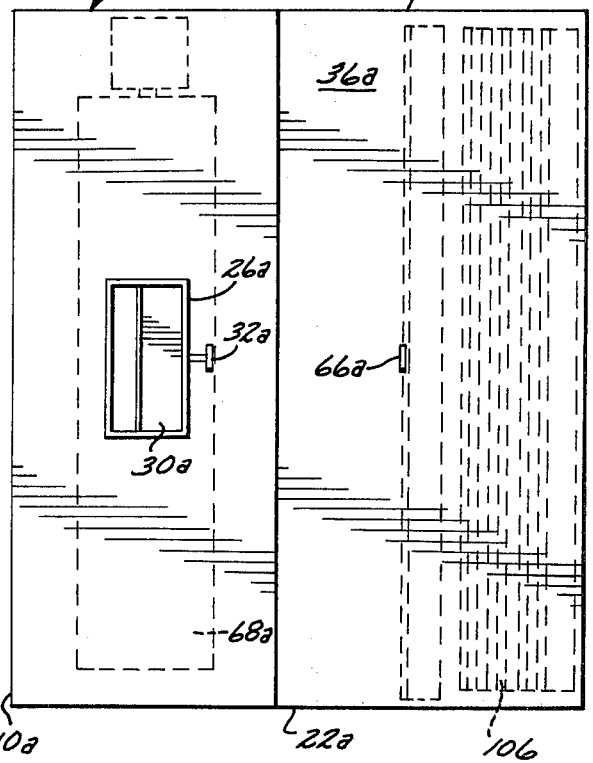
FIG. 6 is a top plan view of the second form of enclosure hood assembly shown in FIG. 2.

A second form of enclosure hood assembly is illustrated in FIGS. 2 and 6 that includes elements common to the first form A-1. Such elements are identified in FIG. 2 by the same numerals previously used but with the letter "a" added as a suffix thereto.

The first horizontal surface defining member 14a extends between the end walls 22a and has an upturned and inwardly extending end portion 90. A second horizontal surface defining member 92 is situated above the first member 14a and has a forwardly disposed upturned end 94. The first and second members 14a and 92 cooperate to define a third passage 96 that is in communication with the first passage 40a. The upturned end portions 90 and 94 cooperate to define a third opening 98 through which a third stream of air 100 discharges upwardly and rearwardly to serve the same function as the second stream of air 82a.

The second form A-2 of the enclosure is adapted primarily to spray painting. A hook 102 or other supporting means depends from the hood 20a as illustrated in FIG. 2, and serves to removably support the work piece 104 to be painted, which work piece is shown in FIG. 2 in phantom line. A conventional heater 106 is situated within hood 20a as shown in FIG. 2, and serves to warm the second stream of air 82a. The warmed stream of air 82a serves to facilitate the solidification of paint particles P on work piece 104.

Figure 7:
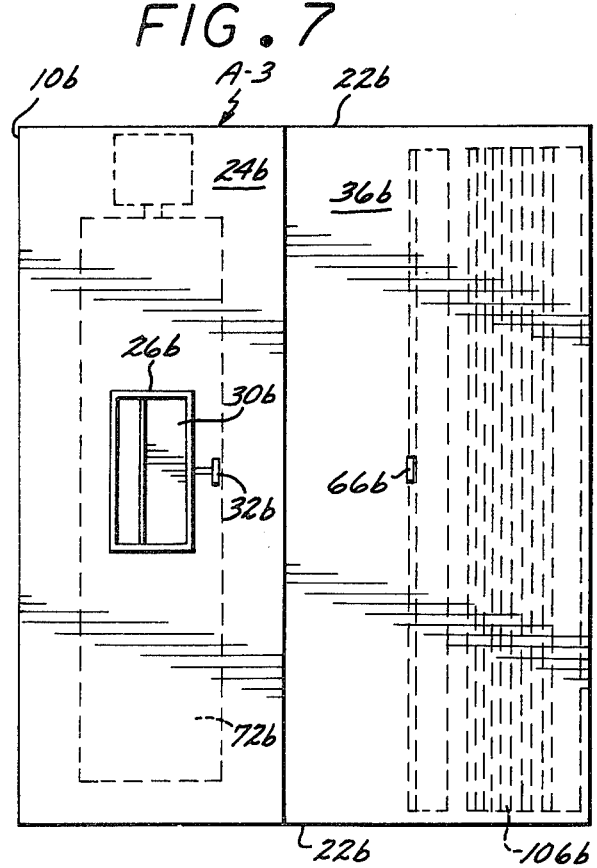
FIG. 7 is a top plan view of the third form of enclosure hood assembly shown in FIG. 3.

A third form A-3 of hood enclosure assembly is illustrated in FIGS. 3 and 7. Certain of the elements in the third form A-3 are common to the first form A-1 and second form A-2. Those elements common to the first and second forms A-1 and A-2 will be identified by the numerals previously used but with the suffix "b" added thereto. The third form A-3 is used as a paint spray booth.

The second clip 76b has a perforated wall 108 depending therefrom, which wall has upwardly and rearwardly extending baffles 109. Wall 108 extends between the end walls 22b. A water containing trough 110 is supported on horizontal surface defining member 14b, and is situated under perforated wall 108. A power driven pump 112 has the suction side thereof connected by a conduit 114 to the lower interior portion of the trough 110, and the discharge outlet connected to a conduit 116 that extends to a spray pipe 118. The spray pipe 118 is located adjacent the top of perforated wall 108 and extends between end walls 22b. Spray pipe 118 is situated rearwardly of a downwardly projecting shield 120 that extends between end walls 22b.

When the third form A-3 of the enclosure is in use air borne particles P of paint that do not lodge on the workpiece 104b tend to be drawn to the perforated wall due to the negative air pressure created by the first stream of air 82b rearwardly of the wall 108. As the air borne particles P of paint move rearwardly they lodge on the perforated wall 108 and are carried by downwardly moving water thereon to the trough 110. The paint particles P float on the water 120 in trough 110 and may be periodically skimmed or otherwise removed therefrom. The heated second air stream 82b not only serves the same function as the second air stream 82 described in connection with the first form A-1 of the enclosure, but also tends to speed up the drying of paint deposited on the work piece 104b.

Figure 8:
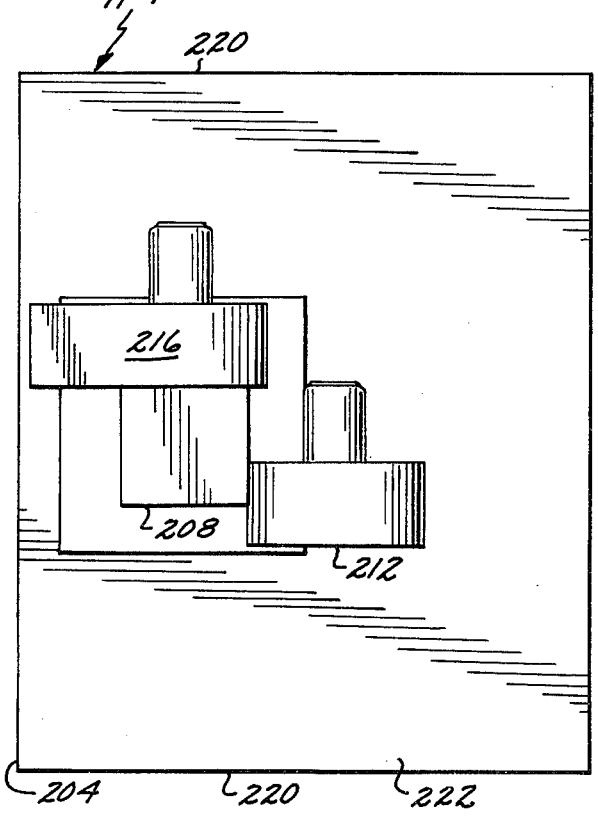
FIG. 8 is a top plan view of the fourth form of enclosure hood assembly shown in FIG. 4.

A fourth form A-4 of the hood enclosure assembly is shown in FIGS. 4 and 8 that is similar to the exhaust hood illustrated and described in my co-pending application Ser. No. 614,473, but is modified to be used as a paint booth.

The fourth form A-4 includes an elevated housing 200 that has a hood 202 extending forwardly therefrom, and the housing having a vertically disposed back plate 204 extending downwardly therefrom to a horizontal surface defining member 206. A vertically disposed duct 208 extends upwardly through housing 200, and cooperates with the housing to define an annulus shaped space 210. A first power driven blower 212 has the discharge 214 thereof in communication with space 210. The suction of first blower 212 is in communication with the ambient atmosphere.

A second power driven blower 216 has the suction 218 thereof in communication with the upper end of duct 208.

The fourth form A-4 includes a pair of spaced end walls 220. Housing 200 projects upwardly from an opening in a horizontal member 222, which member extends between end walls 200 as shown in FIG. 4. Member 222 on the forward edge thereof develops into a downwardly extending first wall 224, which first wall on the lower edge thereof has a second wall 226 extending downwardly and inwardly therefrom. A vertically extending back wall 228 depends from the rearward portion of a forward wall 230. The forward wall 230 has a first portion 232 that has an opening 234 therein from which the duct 208 extends upwardly. Back plate 204 and back wall 228 cooperate to define a first vertically extending passage 235 therebetween. Forward wall 230 has first portion 232 and second and third portions 236 and 238 so disposed that they cooperate with member 202 and first and second walls 224 and 226 as to define a second passage 240 therebetween.

A member 242 of transverse L-shaped cross-section extends between end walls 220, and cooperates with the lower end portion of back wall 228 to define an upwardly directed first opening 244. The third wall portion 234 and second wall 226 cooperate to define a downwardly and rearwardly directed second opening 246.

A trough 248 extends between the end walls 220 and is situated under the member 242. A shield 250 depends from forward wall 230. Back wall 228 and shield 250 support first and second clips 252 and 254, which clips serve as a mounting for a filter 256 as shown in FIG. 4. A perforated, vertically disposed wall 258 depends from shield 250, with the wall having upwardly and rearwardly extending baffles 260 on the rearward surface thereof. A conduit 262 is in communication with the lower interior portion of trough 248 that is filled with water 264. The conduit 262 is connected to the suction of a power driven pump 266, which pump has a conduit 268 extending from the discharge thereof.

A spray pipe 270 extends between end walls 220, and is supported by a clip 272 adjacent the upper portion of perforated wall 258 as shown in FIG. 4. The spray pipe 270 is connected to conduit 268, and when the pump 266 is operating water is discharged to the spray pipe to discharge therefrom onto the perforated wall 258 to cascade downwardly over the latter. Downwardly flowing water from the perforated wall 258 flows into the trough 248.

When the first blower 212 is operating air under pressure is discharged into space 210 to thereafter flow through first and second passages 235 and 240. Air at first and second high velocity streams 272 and 274 discharge from first and second openings 244 and 246.

The first stream 272 flows upwardly along the forward face of rear wall 228 and in so doing creates a negative pressure rearwardly of the perforated wall 258. This negative pressure causes air borne particles of paint P to move towards the perforated wall 258 and upon reaching the latter they become entrained with the downwardly moving water to be carried to the trough 248. The paint particles P collect as a layer on the upper surface of the water 264 in trough 248 where they are periodically removed by a skimming operation. The second stream of air 274 serves to direct air borne particles P towards the perforated wall 258.

A modification of the second form A-2 of the invention is shown in FIG. 9 in which the opening 98 is located substantially mid-point between the horizontal surface 14a and opening 62a defined by hood 20a.

The use and operation of the various forms of the invention have been described previously in detail and need not be repeated.

What is claimed is:

1. In an enclosure having a substantially horizontal floor, a pair of spaced end walls a substantially vertical back plate extending between said end walls, a forwardly extending hood, a housing intermediately disposed between said back plate and hood, and a stack extending upwardly from said housing, the improvement for preventing minute air borne particles in said enclosure from escaping through an opening in the forward portion of the latter into the room in which said enclosure is situated, said improvement comprising:
  a. single power driven blower means in said housing, said blower means having an air inlet and an air discharge;
  b. a back wall that extends downwardly from said air inlet forwardly of said back plate and cooperating therewith to define a first passage in communication with said air discharge;
  c. first means that cooperate with said back wall to define an upwardly directed opening adjacent said floor;
  d. a forward wall that extends forwardly from said air inlet and downwardly spaced from said hood to cooperate with the latter to define a second passage in communication with said air discharge, and said forward wall and hood also cooperating to define a second opening that is directed downwardly and rearwardly at an angle;
  e. air borne particle removing means that extend across said air inlet; and
  f. first adjustable damper means in said stack, said blower means when operating concurrently discharging pressurized air to said stack and said first and second passage, said pressurized air delivered to said first passage discharging from said first opening as a first high velocity air stream along the forward surface of said back plate to create a negative pressure towards which said minute air borne particles tend to move to become entrained with said first stream and be separated therefrom as said first stream flows through said removing means, said pressurized air discharging from said second opening as a downwardly and rearwardly directed second stream that tends to move said minute air borne particles not already entrained with said first air stream rearwardly to so become, said air inlet of said blower maintaining a negative air pressure above said removing means to encourage the flow of said first and second air streams therethrough, said first damper means regulating the magnitude of the rate of flow of air from said enclosure and the room surrounding the latter through said stack to the ambient atmosphere, and said first damper means when closed causing said blower means to recycle air to remove said minute air borne particles therefrom without removing air from a room in which said enclosure is situated.

2. The improvement as defined in claim 1 in which said minute air borne particles are paint spray and said improvement in addition including:
  g. second means for removably supporting a work piece being spray painted in the path of said second air stream; and
  h. third means for heating said air flowing through said second passage prior to said air discharging from said second opening as said second stream of air, with said heated air in said second stream encouraging the rapid drying of paint sprayed on said work piece.

3. The improvement as defined in claim 2 which in addition includes:
  i. third forwardly extending passage means adjacent said horizontal floor, which third passage means on the forward end develops into an upwardly and rearwardly directed opening, said third passage means in communication with said first passage, and a third air stream discharging upwardly and rearwardly from said third opening, with said third air stream serving the same function as said second air stream.

4. The improvement as defined in claim 3 in which said third opening is located a substantial distance above said horizontal floor.

5. The improvement as defined in claim 2 which in addition includes:
  i. a vertically disposed wall having a plurality of perforations therein, said wall depending from said hood and situated forwardly of said particle removing means;
  j. a trough capable of containing water situated under said wall that has said perforations therein; and
  k. pump means for circulating water from said trough to substantially the top of said wall having said perforations therein to cascade downwardly over said perforated wall to entrap said minute air borne particles of paint that are moving rearwardly in said enclosure, said entrapped particles flowing downwardly with said water to said trough to float on water in the latter to be periodically skimmed therefrom.

6. The improvement as defined in claim 5 which in addition includes:
  e. a plurality of spaced baffles that extend upwardly and rearwardly from said wall that has said perforations therein, said baffles horizontally aligned with said perforations, said baffles and perforations allowing said first and second air streams to flow rearwardly therethrough, but said baffles preventing substantial movement of said minute air borne particles rearwardly past said perforated wall.

7. The improvement as defined in claim 1 which in addition includes:
  g. second adjustable damper means on said hood for controlling the rate of flow of air through said second passage and said second opening.

* * * * *